US012583391B2

(12) United States Patent
Son et al.

(10) Patent No.: US 12,583,391 B2
(45) Date of Patent: Mar. 24, 2026

(54) LUGGAGE SPACE-EXTENSIBLE SLIDABLE AND PIVOTABLE BOARD STRUCTURE

(71) Applicants: Hyundai Motor Company, Seoul (KR); Kia Corporation, Seoul (KR)

(72) Inventors: Hong Keun Son, Uiwang (KR); Min Ho Cho, Suwon (KR); Won Young Na, Seongnam (KR); Heon Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 424 days.

(21) Appl. No.: 18/130,123

(22) Filed: Apr. 3, 2023

(65) Prior Publication Data

US 2024/0092270 A1 Mar. 21, 2024

(30) Foreign Application Priority Data

Sep. 16, 2022 (KR) ........................ 10-2022-0117150

(51) Int. Cl.
B60R 5/04 (2006.01)
(52) U.S. Cl.
CPC ................................... B60R 5/041 (2013.01)
(58) Field of Classification Search
CPC ........... B60R 5/04; B60R 5/041; B60R 5/045; B60R 7/02; B60R 2011/0036
See application file for complete search history.

(56) References Cited

U.S. PATENT DOCUMENTS

| | | | | |
|---|---|---|---|---|
| 5,257,846 A | * | 11/1993 | Kanai | ........................ B60R 5/04 16/361 |
| 7,393,036 B2 | | 7/2008 | Bastian et al. | |
| 10,737,627 B2 | * | 8/2020 | Abe | ........................ B60R 5/044 |
| 2018/0037167 A1 | | 2/2018 | Smith et al. | |
| 2019/0077319 A1 | * | 3/2019 | Shin | ........................ B60R 5/045 |
| 2019/0184912 A1 | | 6/2019 | Kato et al. | |

FOREIGN PATENT DOCUMENTS

| | | | | | |
|---|---|---|---|---|---|
| DE | 102008019396 A1 | * | 10/2009 | ............... | B60R 5/04 |
| DE | 102016208551 A1 | * | 11/2017 | ............... | B60R 5/04 |
| EP | 1736364 A1 | * | 12/2006 | ............ | B60R 13/01 |
| EP | 1736365 A1 | * | 12/2006 | ............ | B60R 13/01 |
| EP | 3102462 B1 | * | 12/2017 | ............... | B60R 5/04 |
| JP | 2000025526 A | | 1/2000 | | |

(Continued)

OTHER PUBLICATIONS

DE 102008019396 A1 with English translation (Year: 2009).*

*Primary Examiner* — Lori Lyjak
(74) *Attorney, Agent, or Firm* — Fox Rothschild LLP

(57) ABSTRACT

A luggage space-extensible slidable and pivotable board structure is provided. The board structure includes a board assembly configured to slide forward or backward or pivot upward about an inner side thereof in a luggage space of a vehicle, a rail section configured to be coupled to a hinge part at the inner side so as to be pivotable along with the board assembly, and a handle assembly disposed on an outer side of the board assembly to lock the board assembly, wherein the board assembly is unlocked by the operation of the handle assembly to slide along the rail section, and the board assembly is configured to pivot about the hinge part in a locked state.

20 Claims, 5 Drawing Sheets

(56)                  References Cited

FOREIGN PATENT DOCUMENTS

| JP | 2007314028 | A | 12/2007 |
|----|------------|---|---------|
| JP | 2009035119 | A | 2/2009 |
| JP | 2018075943 | A | 5/2018 |
| KR | 10-2012-0045449 | A | 5/2012 |
| KR | 101591415 | B1 | 2/2016 |

* cited by examiner

LUGGAGE SPACE-EXTENSIBLE SLIDABLE AND PIVOTABLE BOARD STRUCTURE

CROSS REFERENCE TO RELATED APPLICATION

The present application claims under 35 U.S.C. § 119(a) the benefit of Korean Patent Application No. 10-2022-0117150, filed on Sep. 16, 2022, the entire contents of which is incorporated herein for all purposes by this reference.

BACKGROUND

Technical Field

The present disclosure relates to a luggage space-extensible slidable and pivotable board structure and, more preferably, to a board structure in which a board assembly is extensible from a luggage space to the outside of a vehicle with a slidable and pivotable configuration to obtain an extended storage space, along with an additional space under the board assembly that can be used as a storage space.

Background

Recently, interest in luggage space utilization/extensibility of a vehicle during outdoor activities is increasing. Recreational vehicles (RV, SUV, MPV, etc.) have a luggage room for loading cargo in the rear of a rear seat. In the luggage room, the bottom is composed of a luggage board, and a separate storage space is provided under the luggage board to accommodate a spare tire, tools, or the like so that the storage space can be opened or closed by the opening or closing operation of the luggage board.

As the demand for convenience for a vehicle trunk increases, some vehicle models increasingly apply a technique to allow a vehicle passenger to slide the luggage board on which luggage is loaded. In a conventional vehicle, a rail is installed in a trunk in a longitudinal direction of the vehicle and luggage is slid along the rail to facilitate loading or unloading of the luggage. On the other hand, if the luggage board is slid outside the vehicle, the luggage board can be used as a table or a seat for outdoor activities.

However, when only the sliding function is applied to the luggage board, there is a problem in that it is impossible to access the space under the board due to the rail structure. In addition, when the luggage board slides, the rail jaw is exposed to the outside, so that the appearance is deteriorated, or there is a risk that luggage may fall into the back space from which the board is drawn out. On the other hand, when the luggage board is used as a bench or table after sliding, the load is concentrated at the end of the board, making it difficult to support the load.

SUMMARY OF THE DISCLOSURE

The present disclosure has been made in an effort to solve the above-described problem associated with the related art, and an objective of the present disclosure is to provide a luggage space-extensible slidable and pivotable board structure in which a board assembly having a slidable and pivotable configuration is applied in a luggage space of a vehicle to extend the luggage space.

Another objective of the present disclosure is to provide a luggage space-extensible slidable and pivotable board structure in which a screen section is drawn out as a board assembly slides so that luggage is not likely to fall into a space between the board assembly and a rear seat of a vehicle.

The objectives of the present disclosure are not limited to the aforementioned objectives, and other objectives not mentioned may be understood and seen more clearly by embodiments of the present disclosure described in the following description. Also, the objectives of the present disclosure can be realized by the means indicated in claims and combinations thereof.

The luggage space-extensible slidable and pivotable board structure for achieving the above objectives of the present disclosure includes the following configuration.

In an aspect of the present disclosure, there is provided a luggage space-extensible slidable and pivotable board structure including: a board assembly configured to slide forward or backward or pivot upward about an inner side thereof in a luggage space of a vehicle; a rail section configured to be coupled to a hinge part at the inner side so as to be pivotable along with the board assembly; and a handle assembly disposed on an outer side of the board assembly to lock the board assembly, wherein the board assembly is unlocked by the operation of the handle assembly to slide along the rail section, and the board assembly is configured to pivot about the hinge part in a locked state.

In addition, the slidable and pivotable board structure may further include a frame assembly fastened to a floor panel of a vehicle and to which the hinge part is fastened.

In addition, the slidable and pivotable board structure may further include a hydraulic actuator coupled to the frame assembly and the rail section, and configured to maintain the pivoted state of the board assembly. In some embodiments, the structure may further include two hydraulic actuators coupled to the frame assembly and the rail section at both ends of the board assembly, respectively, and configured to maintain the pivoted state of the board assembly.

In addition, the rail section may include: an upper rail fastened to a lower surface of the board assembly and configured to move in a longitudinal direction along with the board assembly; a wheel contacting an inner surface of the upper rail when the board assembly slides; a lower rail disposed at a lower end of the upper rail and configured to be coupled to the hinge part; and a spacer disposed in a space between the upper rail and the lower rail and configured to support load applied to the board assembly.

In some embodiments, the upper rail is fastened to a lower surface of the board assembly. In some embodiments, the lower rail is configured to guide the board assembly to slide rearward therealong. In some embodiments, the upper rail is configured to be drawn out from the lower rail when the board assembly slides rearward. In some embodiments, the upper rail is configured to enter the lower rail when the board assembly is slid forward again.

In addition, the handle assembly may include: a handle part disposed on one side of an upper surface of the board assembly; a stopper connected to the handle part and configured to be connected to the rail section at a lower surface of the board assembly; and a cable configured to connect the handle part and the stopper. The stopper may include a rod configured to fix the rail section, and the rail section may have a hole into which the rod is inserted.

In addition, when the handle part is operated, the cable is tensioned to unlock the rail section so that the board assembly slides.

In addition, the frame assembly may include: a frame on which the board assembly is hinged; a front mounting configured to fasten a front lower portion of the frame to a floor panel of the vehicle; and a rear mounting configured to fasten a rear lower portion of the frame to the floor panel.

In addition, the slidable and pivotable board structure may further include: a first tray disposed at the front side of the board assembly; and a second tray disposed at the rear side of the board assembly adjacent to the first tray, wherein at least one rib is disposed between the first tray and the second tray to support the board assembly and the rail section. In some embodiments, at least one rib is formed along a lateral side of the first tray. In some embodiments, at least one rib is formed along a width side of the second tray.

In another aspect of the present disclosure, there is provided a luggage space-extensible slidable and pivotable board structure including: a board assembly configured to slide forward or backward or pivot upward about an inner side thereof in a luggage space of a vehicle; a rail section configured to be coupled to a hinge part at the inner side so as to be pivotable along with the board assembly; a handle assembly disposed on an outer side of the board assembly to lock the board assembly; a frame assembly fastened to a floor panel of a vehicle and to which the board assembly is hinged; and a screen section configured to be connected to end sides of the board assembly and the frame assembly, wherein the board assembly is unlocked by the operation of the handle assembly to slide so that the screen section is drawn out.

In addition, the screen section may include: a screen configured to be level with the board assembly when the board assembly slides rearward; a screen roller tube fastened to the frame assembly and configured to roll at one end thereof; and a guide tube fastened to the rail section at a position where the board assembly is hinged and configured to support a lower surface of the screen when the screen is drawn out.

In another embodiment, vehicles are provided that comprise an apparatus as disclosed herein.

The present disclosure can obtain the following effects by the configurations and combinations thereof, and the use relationship described below.

The present disclosure has the effect that the board assembly having the slidable and pivotable configuration is applied in the luggage space in a manner as to be extensible from the luggage space to the vehicle outside during outdoor activities so that the board assembly can be used as a table or the like, and a space under the board assembly can also be used as a storage space.

In addition, since the screen section drawn out as the board assembly slides is applied, the present disclosure has the effect of solving the problem of luggage falling into the space between the board assembly and the vehicle rear seat.

The effects of the present disclosure are not limited to those described above, and other effects not mentioned will be clearly recognized by those skilled in the art from the following description.

DETAILED DESCRIPTION OF THE DISCLOSURE

Figure 1A:
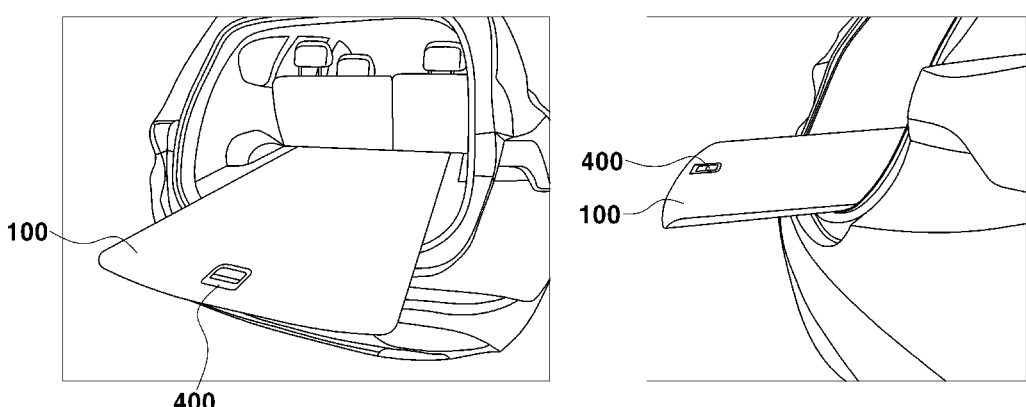
FIG. 1A illustrates the state of a luggage space-extensible slidable and pivotable board structure being slid.

Hereinafter, embodiments of the present disclosure will be described in more detail with reference to the accompanying drawings. The embodiments of the present disclosure may be modified into various forms, and the scope of the present disclosure should not be construed as being limited to the following embodiments. The present embodiments are provided to more completely describe the present disclosure to an ordinary skilled person in the art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

In addition, terms such as " . . . part", " . . . assembly", etc. described herein mean a unit portion that processes at least one function or operation, wherein the unit portion may be implemented by hardware, software or a combination of hardware and software.

In addition, as used herein, a "height direction" means a height direction of a vehicle, and a "width direction" means a lateral direction of a vehicle. The "longitudinal direction" refers to a direction in which a board assembly 100 slides.

In addition, as used herein, "front" refers to the front side in the longitudinal direction of a vehicle, and "rear" refers to the rear side in the longitudinal direction of a vehicle.

In addition, as used herein, "upward" means an upward direction perpendicular to a plane of the drawing, and "downward" means a downward direction directed toward a plane of the drawing.

In addition, although the terms "first", "second", etc. may be used herein to distinguish elements because the name of the elements are the same, the elements are not necessarily limited to the order in the following description.

In addition, as used herein, when a first part is "over" or "on" a second part, this includes not only the case where the first part is "directly on" the second part, but also the case where there is an intermediate part between the first part and the second part. In addition, when a first part is "below" or "under" a second part, this includes not only the case where the first part is "directly below" the second part, but also the case where there is an intermediate part between the first part and the second part.

The present disclosure is directed to a luggage space-extensible slidable and pivotable board structure. FIG. 1A illustrates the state of the luggage space-extensible slidable and pivotable board structure being slid, and FIG. 1B illustrates the state of the luggage space-extensible slidable and pivotable board structure being pivoted.

As illustrated in FIG. 1A, a board assembly 100 may be configured to be slid from the front to the rear of a vehicle to adjust the length by which the board assembly protrudes out of a vehicle. For example, the board assembly 100 may be slid about 400 mm outward in a longitudinal direction in a bench mode so that the board assembly can be used as a bench. The board assembly 100 may be configured to support a load of 200 kg in the bench mode so that two adults can seat on the board assembly. As another example, the board assembly 100 may be slid about 600 mm in a longitudinal direction in a table mode so that the board assembly can be used as a table. The board assembly 100 may be configured to support a load of 20 kg in the table mode so that camping tableware or the like can be placed on the board assembly.

The board assembly 100 may be configured to slide with the operation of a handle assembly 400. More preferably, the board assembly 100 may be unlocked with the operation of the handle assembly 400 so that the board assembly slides rearward. In addition, in a stationary state, when the handle assembly 400 is operated again, the board assembly may be configured to be unlocked so that the board assembly slides forward.

Figure 1B:
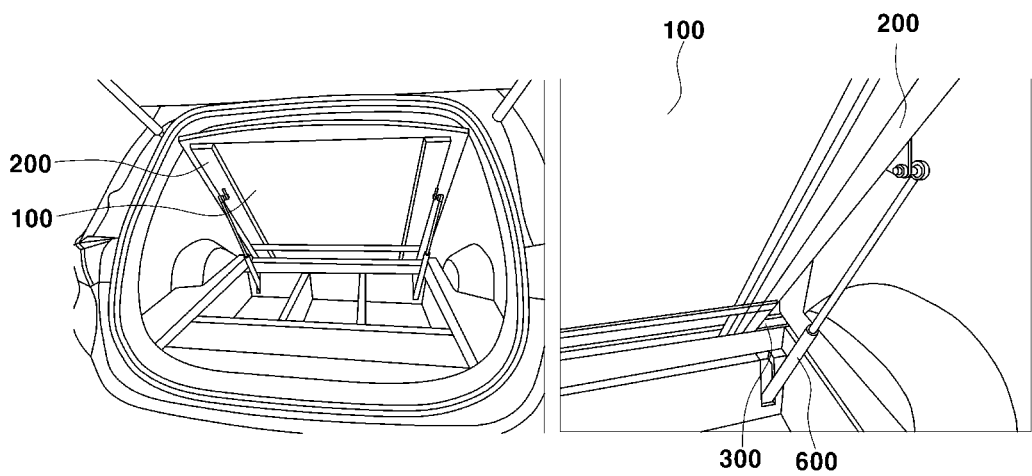
FIG. 1B illustrates the state of a luggage space-extensible slidable and pivotable board structure being pivoted.

As illustrated in FIG. 1B, the board assembly 100 may be configured to pivot upward from a horizontal position. Since the board assembly 100 is configured to be slidable along a rail section 200 that is pivotable along with the board assembly, a space under the board assembly can be used as a storage space by pivoting the board assembly.

In an embodiment of the present disclosure, when pivoting the board assembly 100, an initial pivoting force may be lowered by using a hydraulic actuator 600. The hydraulic actuator 600 is configured such that one end is fastened to a vehicle body and the other end is fastened to the rail section 200, so that when a user applies a pivoting force, the hydraulic actuator forces one side of the board assembly 100 to move upward. For example, when pivoting the board assembly 100 upward, the hydraulic actuator may be configured to allow the initial pivoting force to be 2 kgf or less.

Figure 2:
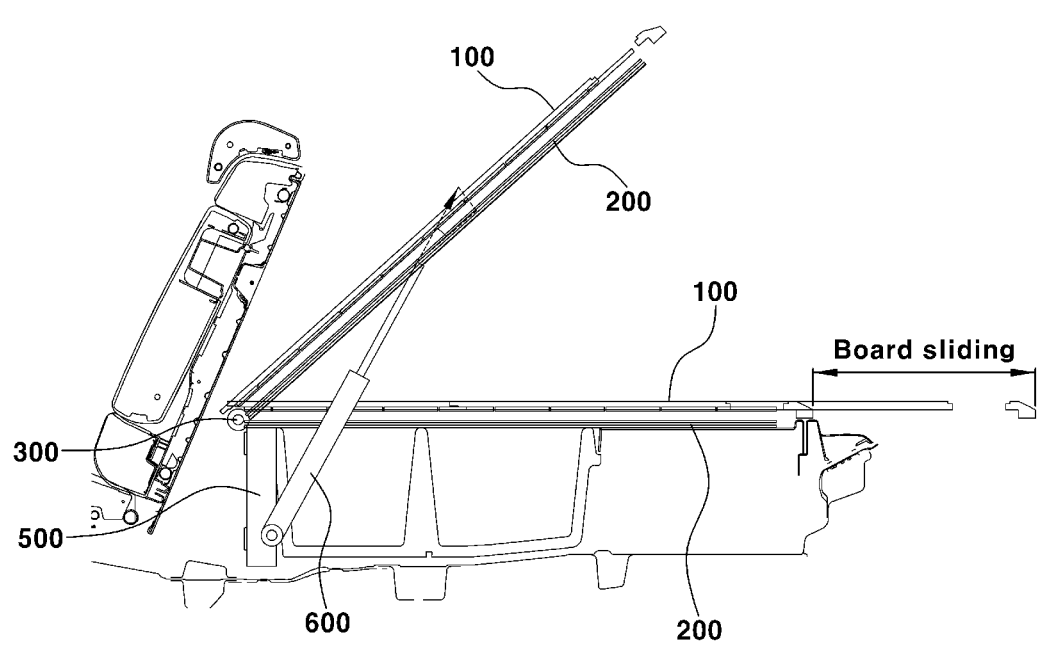
FIG. 2 is a side cross-sectional view illustrating a luggage space-extensible slidable and pivotable board structure according to an embodiment of the present disclosure.
Figure 3:
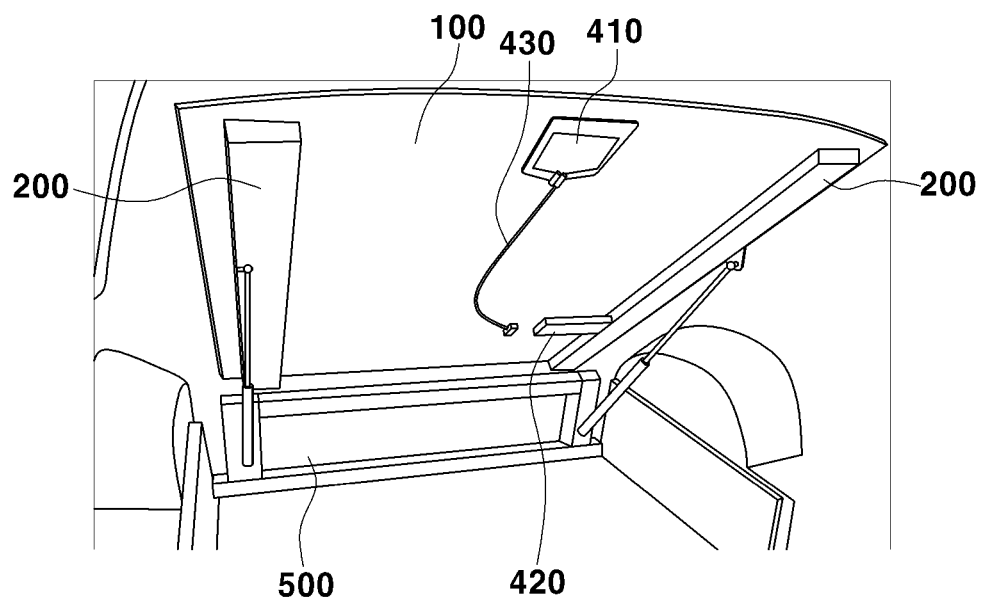
FIG. 3 illustrates a lower surface of a board assembly in a rotated state of the slidable and pivotable board structure according to an embodiment of the present disclosure.

FIG. 2 is a side cross-sectional view illustrating a luggage space-extensible slidable and pivotable board structure according to an embodiment of the present disclosure, and FIG. 3 illustrates a lower surface of a board assembly in a rotated state of the slidable and pivotable board structure according to an embodiment of the present disclosure.

Referring to FIGS. 2 and 3, the slidable and pivotable board structure may include a board assembly 100, a rail section 200 that is pivotable along with the board assembly 100, and a handle assembly 400. The rail section 200 is fastened to the lower surface of the board assembly 100 in a state of being coupled to a hinge part 300 at an inner side thereof, so that the board assembly can be configured to pivot around the hinge part 300 while being slid along the rail section 200.

More specifically, the board assembly 100 may be configured to slide forward and backward of a vehicle or pivot upwards around an inner side of the board assembly. The board assembly 100 may be configured to slide rearward and protrude to the outside of the vehicle. The board assembly 100 may be configured to slide rearward and stop at a desired position according to a user's manipulation.

In an embodiment, the board assembly 100 may be configured to be slidable by 40% of a total length of the board assembly. The board assembly 100 may be configured to adjust the length by which the board assembly protrudes out of a vehicle in consideration of the load applied to one side of the board assembly. For example, the board assembly 100 may be configured to support a load of 200 kgf intensively applied to one side when the board assembly 100 is slid rearward by 40% of the total length.

The rail section 200 may also pivot along with the board assembly 100, and may be coupled to the hinge part 300 at an inner side thereof. More preferably, the rail section 200 is fastened to the lower surface of the board assembly 100 so that the rail section may pivot along with the board assembly 100. The rail section 200 may be configured to be coupled to the hinge part 300 at one side thereof so that the board assembly 100 is pivoted upward and opened with respect to the hinge part 300.

The handle assembly 400 may be disposed on the outer side of the board assembly 100 to lock the board assembly 100. More specifically, the handle assembly 400 may include a handle part 410, a stopper 420, and a cable 430. The handle part 410 may be disposed on the outer side of an upper surface of the board assembly 100. The handle part 410 may be exposed to the outside on the outer side of the board assembly 100 so that a user can operate the handle part. The stopper 420 may be connected to the handle part 410 and the rail section 200 at the lower surface of the board assembly 100. The cable 430 may be configured to connect the handle part 410 and the stopper 420.

According to an embodiment of the present disclosure, when a user operates the handle part 410, the cable 430 is tensioned to unlock the rail section 200 so that the board assembly 100 may slide along the rail section. The board assembly 100 may be unlocked with the operation of the handle assembly 400 so that the board assembly slides along the rail section 200. More preferably, the board assembly 100 may be unlocked with the operation of the handle part 410 to slide rearward, and may be locked, stopping sliding to pivot around the hinge part 300. In an embodiment, the stopper 420 may include a rod configured to fix the rail section 200, and the rail section has a hole into which the rod is inserted, so that when a user pulls the handle part 410, the cable 430 is tensioned so that the rod can be disengaged from the hole. Accordingly, the board assembly 100 may be unlocked with the operation of the handle part 410 to slide rearward or forward.

The slidable and pivotable board structure according to an embodiment of the present disclosure may be configured to further include a frame assembly 500 and a hydraulic actuator 600. The frame assembly 500 may be fastened to a floor panel of a vehicle, and the hinge part 300 may be fastened to the frame assembly. The hydraulic actuator 600 may be configured such that one end is coupled to the frame assembly 500 and the other end is coupled to the rail section 200. The hydraulic actuator 600 may be configured to maintain the pivoted state of the board assembly 100. In an embodiment, two hydraulic actuators 600 may be positioned at both ends of the board assembly 100 in the width direction.

Positions where both ends of the hydraulic actuator 600 are fixed to the frame assembly 500 and the rail section 200 may be set in consideration of a pivotal opening angle of the board assembly 100. The board assembly 100 may be configured to maintain the pivotal opening angle with a hydraulic force from the hydraulic actuator 600. In addition, the hydraulic actuator 600 may provide a hydraulic force to reduce the user's initial pivotal operating force.

Figure 4A:
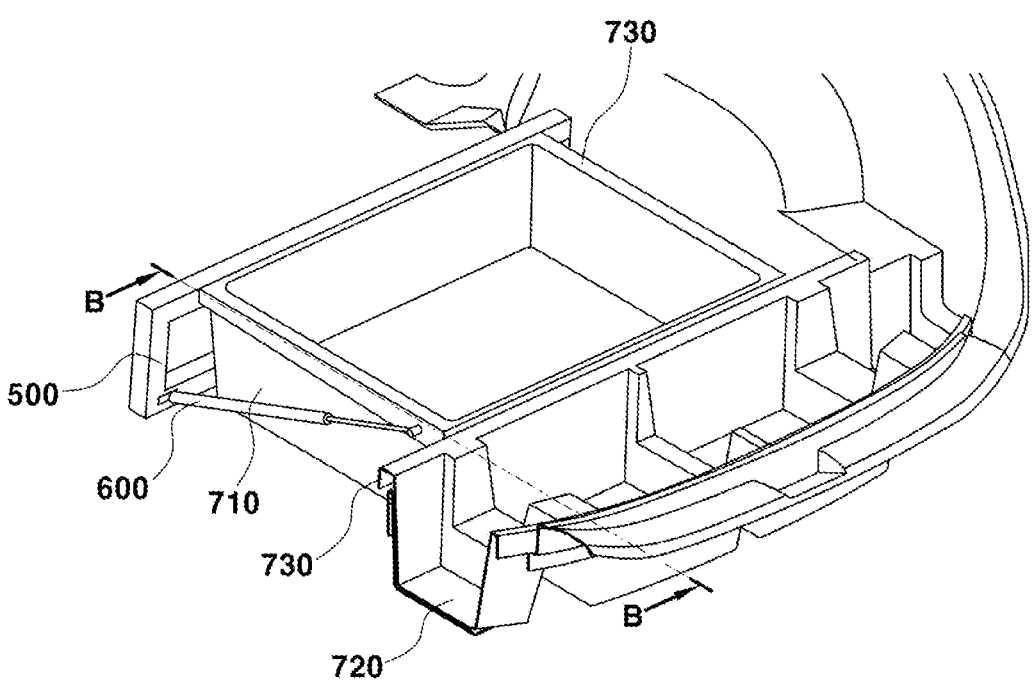
FIG. 4A illustrates a first tray and a second tray of the slidable and pivotable board structure according to an embodiment of the present disclosure.
Figure 4B:
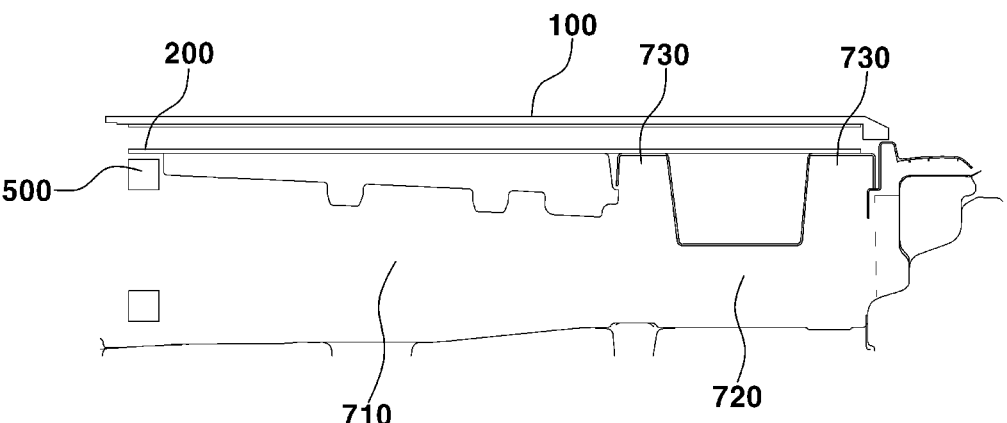
FIG. 4B is a side cross-sectional view illustrating the first tray and the second tray of the slidable and pivotable board structure according to an embodiment of the present disclosure.

FIG. 4A illustrates a first tray and a second tray of the slidable and pivotable board structure according to an embodiment of the present disclosure, and FIG. 4B is a side cross-sectional view illustrating the first tray and the second tray of the slidable and pivotable board structure according to an embodiment of the present disclosure.

Referring to FIGS. 4A and 4B, the slidable and pivotable board structure according to an embodiment of the present disclosure is configured to include a first tray 710 and a second tray 720, which are used as storage spaces. The first tray 710 and the second tray 720 may be configured to respectively form separate storage spaces when the board assembly 100 is pivoted and opened upward.

More specifically, the first tray 710 may be located at the front side of the board assembly 100. The second tray 720 may be located at the rear side of the board assembly 100 adjacent to the first tray 710. At least one rib 730 may be formed between the first tray 710 and the second tray 720 to support the board assembly 100 and the rail section 200. The board assembly 100 and the rail section 200 may be configured to be supported by the rib 730 when load is applied or concentrated on the upper surface or one side thereof.

For example, the rib 730 may be formed along a lateral side of the first tray 710, and may be configured to support the load of the rail section 200 and the board assembly 100 in contact with the rail section 200. In addition, the rib 730 may be formed along a width side of the second tray 720, and may be configured to support the concentrated load of the rail section 200 and the board assembly 100 in contact with a portion of a lower surface of the rail section 200.

Figure 5:
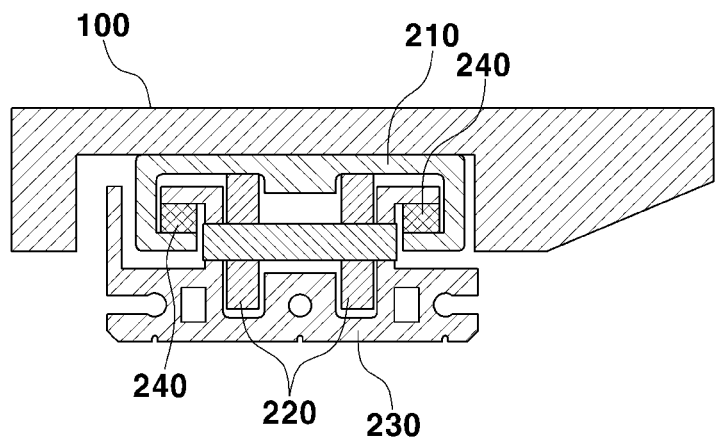
FIG. 5 illustrates a rail section of the slidable and pivotable board structure according to an embodiment of the present disclosure.

FIG. 5 illustrates a rail section of the slidable and pivotable board structure according to an embodiment of the present disclosure.

Referring to FIG. 5, the rail section 200 may be configured to include an upper rail 210, a lower rail 230, a wheel 220, and a spacer 240. The upper rail 210 may be coupled to the lower surface of the board assembly 100 and may be configured to move along with the board assembly 100 in the longitudinal direction. More preferably, the upper rail 210 may be fastened to the lower surface of the board assembly 100, and may be configured to extend in the longitudinal direction so that the board assembly 100 slides therealong. The wheel 220 may be configured to contact an inner surface of the upper rail 210 when the board assembly 100 slides.

The lower rail 230 may be positioned below the upper rail 210 and may be configured to be coupled to the hinge part 300. More preferably, the lower rail 230 may guide the board assembly 100 to slide rearward therealong. The spacer 240 may be positioned in a space between the upper rail 210 and the lower rail 230, and may be configured to support load applied to the board assembly 100.

The lower rail 230 may be configured such that an end of the hydraulic actuator 600 is fastened to the lower surface thereof, and the hinge part 300 is fastened to one end side thereof. The upper rail 210 may be configured to be drawn out from the lower rail 230 when the board assembly 100 slides rearward. The upper rail 210 may be configured to enter the lower rail 230 when the board assembly 100 is slid forward again.

The spacer 240 may be configured to fill a space between the upper rail 210 and the lower rail 230. The spacer 240 may be configured to support load concentrated on one side of the board assembly after the board assembly is slid to the outside. For example, when the board assembly 100 is used in a bench mode, the spacer 240 may be configured to increase a support force for load applied to one side of the board assembly in the bench mode.

Figure 6A:
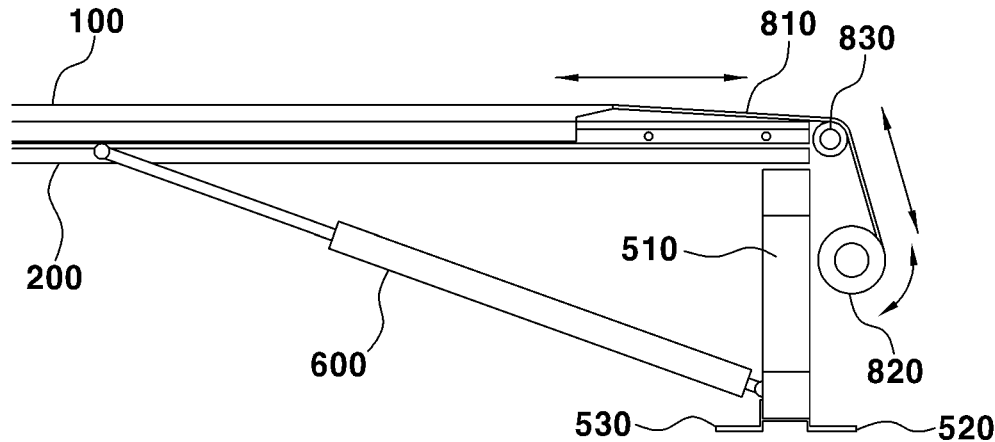
FIG. 6A illustrates a state in which a screen section of the slidable and pivotable board structure is drawn out according to an embodiment of the present disclosure.
Figure 6B:
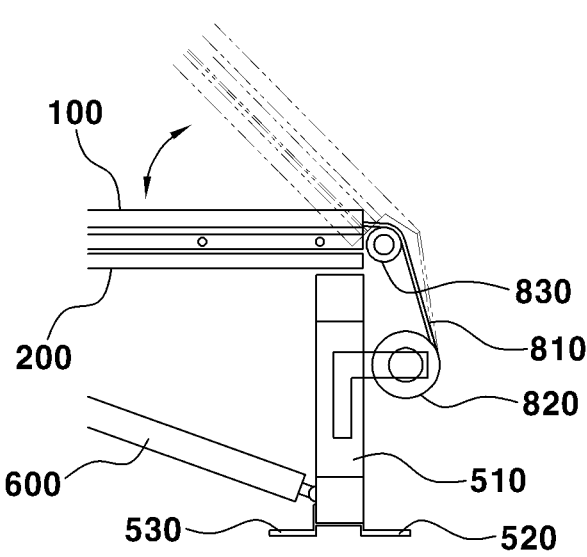
FIG. 6B illustrates a state in which the board assembly is pivoted while the screen section of the slidable and pivotable board structure is not drawn out according to an embodiment of the present disclosure.

FIG. 6A illustrates a state in which a screen section of the slidable and pivotable board structure is drawn out according to an embodiment of the present disclosure, and FIG. 6B illustrates a state in which the board assembly is pivoted while the screen section of the slidable and pivotable board structure is not drawn out according to an embodiment of the present disclosure.

Referring to FIGS. 6A and 6B, the frame assembly 500 may be configured to include a frame 510, a front mounting 520, and a rear mounting 530. The frame 510 may be fixed to a vehicle body floor panel adjacent to a vehicle rear seat. The board assembly 100 may be hinged on the frame 510. The front mounting 520 may be configured to fasten the front lower portion of the frame 510 to the floor panel of a vehicle. The rear mounting 530 may be configured to fasten the rear lower portion of the frame 510 to the vehicle floor panel.

On the other hand, a luggage space-extensible slidable and pivotable board structure according to another embodiment of the present disclosure may be configured to include a board assembly 100, a rail section 200, a handle assembly 400, a frame assembly 500, and a screen section 800. The screen section 800 may be configured to be connected to end sides of the frame assembly 500 and the board assembly 100. The screen section 800 may be configured to be drawn out when the board assembly 100 is unlocked and slid with the operation of the handle assembly 400.

More specifically, the screen section 800 may be configured to include a screen 810, a screen roller tube 820, and a guide tube 830. The screen 810 may be configured to be level with the board assembly 100 when the board assembly 100 slides rearward. When the board assembly 100 slides rearward, the screen 810 may extend from one end side of the board assembly 100 to prevent luggage from falling forward.

The screen roller tube 820 may be fastened to the frame assembly 500, and may be configured such that one end of the screen 810 is rolled. The screen roller tube 820 may be configured to roll the screen 810 when the board assembly 100 is slid forward. The screen 810 may be configured to be unrolled from the screen roller tube 820 when the board assembly 100 is slid rearward.

The guide tube 830 may be coupled to the rail section 200 at a position where the board assembly 100 is hinged, and may be configured to support the lower surface of the screen 810 when the screen 810 is drawn out. More preferably, the guide tube 830 may be fastened to one end of the lower rail 230, and may be configured to move down when the board assembly 100 is pivoted and opened. The guide tube 830 may be positioned at the front side relative to the hinge part 300 so that when the board assembly 100 is pivoted and opened, the guide tube may be configured to move downward. The vertical separation distance between the screen roller tube 820 and the guide tube 830 may be set in consideration of the distance of the downward movement of the guide tube 830.

In summary, the present disclosure provides the board structure 100 in which the board assembly is extensible from the luggage space to the outside of a vehicle with the slidable and pivotable configuration to obtain an extended storage space, along with an additional space under the board assembly 100 that can be used as a storage space.

The foregoing detailed description is illustrative of the present disclosure. In addition, the above description shows and describes preferred embodiments of the present disclosure, and the present disclosure may be used in various other combinations, modifications, and environments. That is, changes or modifications may be made within the scope of the concept of the invention disclosed in the present disclosure, the scope equivalent to the disclosed content, and/or the skill or knowledge in the art. The described embodiment illustrates the best mode for implementing the technical idea of the present disclosure, and various changes required in the specific application fields and uses of the present disclosure are possible. Therefore, the detailed description of the present disclosure is not intended to limit the invention to the disclosed embodiment. In addition, the appended claims should be construed as including other embodiments.

What is claimed is:

1. A luggage space-extensible slidable and pivotable board structure comprising:
   a board assembly configured to slide forward or backward or pivot upward about an inner side thereof in a luggage space of a vehicle;
   a rail section configured to be coupled to a hinge part at the inner side so as to be pivotable along with the board assembly; and
   a handle assembly disposed on an outer side of the board assembly to lock the board assembly,
   wherein the board assembly is unlocked by the operation of the handle assembly to slide along the rail section, and the board assembly is configured to pivot about the hinge part in a locked state.

2. The luggage space-extensible slidable and pivotable board structure of claim 1, further comprising a frame assembly fastened to a floor panel of a vehicle.

3. The luggage space-extensible slidable and pivotable board structure of claim 2, the hinge part is fastened to the frame assembly.

4. The luggage space-extensible slidable and pivotable board structure of claim 2, further comprising a hydraulic actuator coupled to the frame assembly and the rail section, and configured to maintain the pivoted state of the board assembly.

5. The luggage space-extensible slidable and pivotable board structure of claim 3, further comprising two hydraulic actuators coupled to the frame assembly and the rail section at both ends of the board assembly, respectively, and configured to maintain the pivoted state of the board assembly.

6. The luggage space-extensible slidable and pivotable board structure of claim 1, wherein the rail section comprises:
   an upper rail coupled to a lower surface of the board assembly and configured to move in a longitudinal direction along with the board assembly;
   a wheel contacting an inner surface of the upper rail when the board assembly slides;
   a lower rail disposed at a lower end of the upper rail and configured to be coupled to the hinge part; and
   a spacer disposed in a space between the upper rail and the lower rail and configured to support load applied to the board assembly.

7. The luggage space-extensible slidable and pivotable board structure of claim 6, wherein the upper rail is fastened to a lower surface of the board assembly.

8. The luggage space-extensible slidable and pivotable board structure of claim 6, wherein the lower rail is configured to guide the board assembly to slide rearward therealong.

9. The luggage space-extensible slidable and pivotable board structure of claim 6, wherein the upper rail is configured to be drawn out from the lower rail when the board assembly slides rearward.

10. The luggage space-extensible slidable and pivotable board structure of claim 9, wherein the upper rail is configured to enter the lower rail when the board assembly is slid forward again.

11. The luggage space-extensible slidable and pivotable board structure of claim 1, wherein the handle assembly comprises:
   a handle part disposed on one side of an upper surface of the board assembly;
   a stopper connected to the handle part and configured to be connected to the rail section at a lower surface of the board assembly; and
   a cable configured to connect the handle part and the stopper.

12. The luggage space-extensible slidable and pivotable board structure of claim 11, wherein when the handle part is operated, the cable is tensioned to unlock the rail section so that the board assembly slides.

13. The luggage space-extensible slidable and pivotable board structure of claim 11, wherein the stopper comprises a rod configured to fix the rail section, and the rail section has a hole into which the rod is inserted.

14. The luggage space-extensible slidable and pivotable board structure of claim 2, wherein the frame assembly comprises:
   a frame on which the board assembly is hinged;
   a front mounting configured to fasten a front lower portion of the frame to a floor panel of the vehicle; and
   a rear mounting configured to fasten a rear lower portion of the frame to the floor panel.

15. The luggage space-extensible slidable and pivotable board structure of claim 1, further comprising:

a first tray disposed at the front side of the board assembly; and a second tray disposed at the rear side of the board assembly adjacent to the first tray.

16. The luggage space-extensible slidable and pivotable board structure of claim 15, wherein at least one rib is disposed between the first tray and the second tray to support the board assembly and the rail section.

17. The luggage space-extensible slidable and pivotable board structure of claim 15, wherein at least one rib is formed along a lateral side of the first tray or a width side of the second tray.

18. A luggage space-extensible slidable and pivotable board structure comprising:

a board assembly configured to slide forward or backward or pivot upward about an inner side thereof in a luggage space of a vehicle;

a rail section configured to be coupled to a hinge part at the inner side so as to be pivotable along with the board assembly;

a handle assembly disposed on an outer side of the board assembly to lock the board assembly; and a screen section configured to be connected to one side of a vehicle body and the inner side of the board assembly, wherein the board assembly is unlocked by the operation of the handle assembly to slide so that the screen section is drawn out.

19. The luggage space-extensible slidable and pivotable board structure of claim 18, wherein the screen section comprises:

a screen configured to be level with the board assembly when the board assembly slides rearward;

a screen roller tube fastened to the vehicle body and configured to roll at one end thereof; and a guide tube fastened to the rail section at a position where the board assembly is hinged and configured to support a lower surface of the screen when the screen is drawn out.

20. A vehicle comprising the luggage space-extensible slidable and pivotable board structure of claim 1.

* * * * *